(12) United States Patent
Wajata

(10) Patent No.: US 8,072,560 B2
(45) Date of Patent: Dec. 6, 2011

(54) ELECTRODE FOR COLD CATHODE TUBE, AND COLD CATHODE TUBE AND LIQUID CRYSTAL DISPLAY DEVICE USING THE SAME

(75) Inventor: Takayuki Wajata, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 239 days.

(21) Appl. No.: 12/438,831

(22) PCT Filed: Aug. 31, 2007

(86) PCT No.: PCT/JP2007/000938
§ 371 (c)(1), (2), (4) Date: Feb. 25, 2009

(87) PCT Pub. No.: WO2008/029507
PCT Pub. Date: Mar. 13, 2008

(65) Prior Publication Data
US 2009/0316076 A1 Dec. 24, 2009

(30) Foreign Application Priority Data
Sep. 8, 2006 (JP) .................................. 2006-243859

(51) Int. Cl.
*G02F 1/1335* (2006.01)

(52) U.S. Cl. ........................................................ 349/65
(58) Field of Classification Search .................. None
See application file for complete search history.

(56) References Cited

U.S. PATENT DOCUMENTS

| | | | |
|---|---|---|---|
| 7,800,712 B2* | 9/2010 | Suzuki et al. | 349/71 |
| 2008/0192176 A1* | 8/2008 | Aoyama | 349/65 |
| 2009/0096958 A1* | 4/2009 | Matsuura et al. | 349/70 |
| 2009/0195188 A1* | 8/2009 | Maniwa et al. | 315/294 |

FOREIGN PATENT DOCUMENTS

| | | |
|---|---|---|
| JP | 2001-176445 A | 6/2001 |
| JP | 2003-242927 A | 8/2003 |
| JP | 2004-178875 A | 6/2004 |
| JP | 2005-015917 A | 1/2005 |
| WO | WO 2005/069349 A1 | 7/2005 |

* cited by examiner

*Primary Examiner* — Sung Pak
(74) *Attorney, Agent, or Firm* — Foley & Lardner LLP

(57) ABSTRACT

An electrode (1) for cold cathode tube has a cylindrical sidewall portion (2), a bottom portion (3) provided at one end of the sidewall portion, and an opening portion (4) provided at the other end of the sidewall portion. The sidewall portion and the bottom portion are made of tungsten. The tungsten has fibrous crystalline structure extending substantially perpendicularly to a direction of thickness of the sidewall portion or the bottom portion. The thickness T of the sidewall portion or the bottom portion and an average width W of the fibrous crystalline structures in the direction of the thickness satisfy the following relational expression: $0.003 \leq W/T \leq 0.07$.

12 Claims, 5 Drawing Sheets

ELECTRODE FOR COLD CATHODE TUBE, AND COLD CATHODE TUBE AND LIQUID CRYSTAL DISPLAY DEVICE USING THE SAME

TECHNICAL FIELD

The present invention relates to an electrode for cold cathode tube, and a cold cathode tube and a liquid crystal display device using the same.

BACKGROUND ART

Cold cathode tubes have conventionally been used as backlights of liquid crystal display devices. In addition to high brightness and high efficiency, a long life is required of cold cathode tubes in such application. For example, in the application in a liquid crystal TV and the like, they are required to have a long life of more than 60000 hours. Further, since the discharge starts with glow discharge in cold cathode tubes, a material more easily causing the start of the discharge is desired for electrodes for cold cathode tube.

A cold cathode tube useful as a backlight for liquid crystal display device has a structure such that minute amounts of mercury and rare gas are filled in a glass tube whose inner surface is coated with a phosphor, and electrodes for cold cathode tube and lead-in wires (for example, KOV+dumet wires) are mounted in both end portions of the glass tube. In such a cold cathode tube, upon voltage application to the electrodes in the both ends, the mercury sealed in the glass tube is evaporated, resulting in emission of ultraviolet light, and the phosphor absorbs the ultraviolet light to emit light.

As a material forming electrodes for cold cathode tube, a material which is relatively easily worked, such as Ni, Ti, or Al, is used. Such an electrode for cold cathode tube, however, is likely to deteriorate the life of a lamp because of a relatively high cathode fall voltage necessary for electron emission from the electrode to a discharge space and because of the occurrence of what is called a sputtering phenomenon. The sputtering phenomenon refers to a phenomenon that an electrode material scatters when ions collide with the electrode during lighting of the cold cathode tube, and the scattered material, the mercury, and the like deposit on a wall surface in the glass tube.

The mercury is taken into a deposit layer formed by the sputtering phenomenon, and thus is not usable for light emission, which extremely lowers brightness of the cold cathode tube. Reducing such a sputtering phenomenon reduces the consumption of the mercury, realizing a longer life even with the same amount of the sealed mercury.

In order to lower the cathode fall voltage and reduce the sputtering phenomenon, an electrode structure has been attempted in which an electrode for cold cathode tube is formed in a bottomed cylindrical shape and a cutout portion is provided in its sidewall portion (see a Patent Reference 1). This structure aims at both the effect of lowering the cathode fall voltage and the effect of reducing the sputtering, by a hollow cathode effect.

Further, there has been made a proposal of a cylindrical electrode for cold cathode tube made of tungsten or the like, whose surface area is increased by setting a relation between a thickness a of its bottom portion and a thickness b of its side surface portion to a>b and by using a sintered compact with a 80 to 98% relative density (see a Patent Reference 2). With these designs, it has been attempted to increase a coverage amount of an electron emissive material to prolong the life of the cold cathode tube.

The electrodes for cold cathode tubes are modified in their shapes and the like, thereby realizing a longer life. However, the conventional electrodes for cold cathode tube are facing a demand for further improvement in characteristic though a certain level of improvement is recognized therein regarding a discharge start characteristic, a life characteristic, and the like. Further, the electrodes for cold cathode tube are manufactured by, for example, using a drawn metal plate. However, conventional metal plates used for manufacturing the electrodes have a problem that those excellent in workability are inferior in discharge start characteristic and the like, whereas those excellent in discharge start characteristic are inferior in workability.

Patent Reference 1: JP-A 2001-176445 (KOKAI)
Patent Reference 2: JP-A 2004-178875 (KOKAI)

DISCLOSURE OF THE INVENTION

It is an object of the present invention to provide an electrode for cold cathode tube excellent in discharge start characteristic and life characteristic and excellent in manufacturability. It is another object of the present invention to provide a cold cathode tube and a liquid crystal display device using such an electrode for cold cathode tube.

An electrode for cold cathode tube according to an aspect of the present invention includes a cylindrical sidewall portion, a bottom portion provided at one end of the sidewall portion, and an opening portion provided at the other end of the sidewall portion, wherein at least one portion selected from the sidewall portion and the bottom portion is mainly made of tungsten, and wherein the portion mainly made of tungsten has a fibrous crystalline structure extending substantially perpendicularly to a direction of thickness of the portion, and the fibrous crystalline structure satisfies $0.003 \leq W/T \leq 0.07$, where T is the thickness of the portion and W is an average width of the fibrous crystalline structures in the direction of the thickness.

A cold cathode tube according to an aspect of the present invention includes a tubular translucent bulb in which a discharge medium is sealed, a phosphor layer provided on an inner wall surface of the tubular translucent bulb, and a pair of electrodes disposed in both end portions of the tubular translucent bulb, each of the electrodes being composed of the electrode for cold cathode tube according to the aspect of the present invention.

A liquid crystal display device according to an aspect of the present invention includes the cold cathode tube according to the aspect of the present invention, a light guide disposed in proximity to the cold cathode tube, a reflector disposed on one surface side of the light guide, and a liquid crystal display panel disposed on the other surface side of the light guide.

EXPLANATION OF NUMERALS

1 ... electrode for cold cathode tube, 2 ... sidewall portion, 3 ... bottom portion, 4 ... opening portion, 5 ... lead-in wire, 6 ... glass bead, 20 ... cold cathode tube, 21 ... tubular translucent bulb, 22 ... phosphor layer, 30 ... liquid crystal display device, 31 ... liquid crystal display panel, 32 ... diffusion plate, 33 ... light guide, 34 ... reflector, 35 ... reflector for cold cathode tube, C ... fibrous crystalline structure.

BEST MODE FOR CARRYING OUT THE INVENTION

Hereinafter, embodiments for carrying out the present invention will be described. An electrode for cold cathode tube according to an embodiment of the present invention includes a cylindrical sidewall portion, a bottom portion provided at one end of the sidewall portion, and an opening portion provided at the other end of the sidewall portion, and at least one portion selected from the sidewall portion and the bottom portion is mainly made of tungsten. The portion mainly made of tungsten has a fibrous crystalline structure extending substantially perpendicularly to a direction of its thickness. The fibrous crystalline structure satisfies $0.003 \leq W/T \leq 0.07$, where T is the thickness of the portion mainly made of tungsten and W is an average width of the fibrous crystalline structure in the direction of the thickness T.

Figure 1:
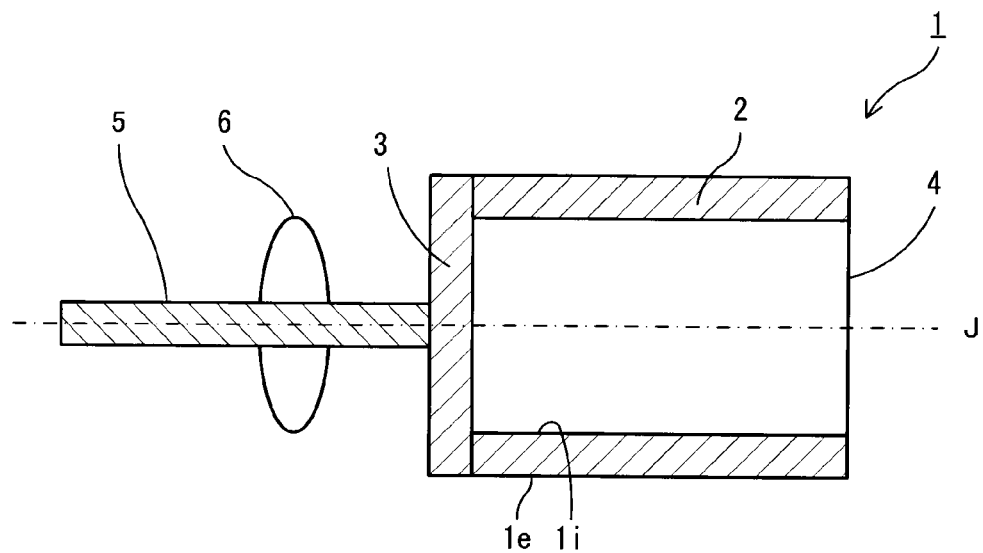
FIG. 1 is a cross-sectional view showing an electrode for cold cathode tube according to an embodiment of the present invention.

FIG. 1 shows the structure of an electrode for cold cathode tube according to an embodiment of the present invention. The electrode 1 for cold cathode tube shown in FIG. 1 includes a cylindrical sidewall portion 2, a bottom portion 3 provided at one end of the sidewall portion 2, and an opening portion 4 provided at the other end of the sidewall portion 2. A straight line J is an axis passing along a center axis of the electrode 1 for cold cathode tube. A lead-in wire 5 in, for example, a rod shape may be joined to the electrode 1 for cold cathode tube, and a glass bead 6 may be provided on the lead-in wire 5.

Figure 2:
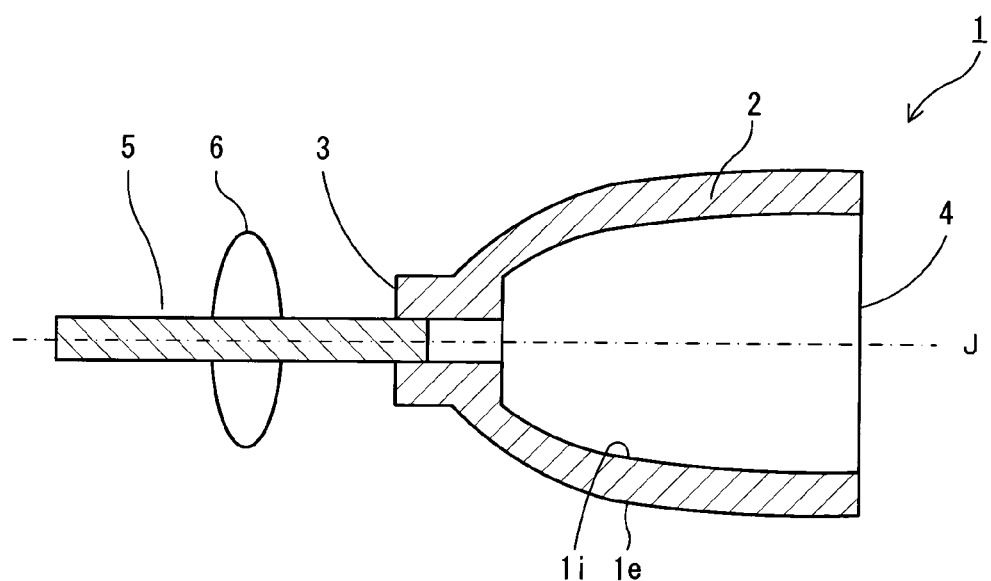
FIG. 2 is a cross-sectional view showing an electrode for cold cathode tube according to another embodiment of the present invention.

FIG. 2 shows the structure of an electrode for cold cathode tube according to another embodiment of the present invention. Similarly to the electrode 1 for cold cathode tube shown in FIG. 1, the electrode 1 for cold cathode tube shown in FIG. 2 includes: a cylindrical sidewall portion 2; a bottom portion 3 provided at one end of the sidewall portion 2; and an opening portion 4 provided at the other end of the sidewall portion 2. Unlike the electrode 1 for cold cathode tube shown in FIG. 1, the electrode 1 for cold cathode tube shown in FIG. 2 has a structure such that a diameter of a cross section of the sidewall portion 2 is reduced toward the bottom portion 3. Further, part of the lead-in wire 5 is inserted in the bottom portion 3, and the lead-in wire 5 forms part of the bottom portion 3.

Figure 3:
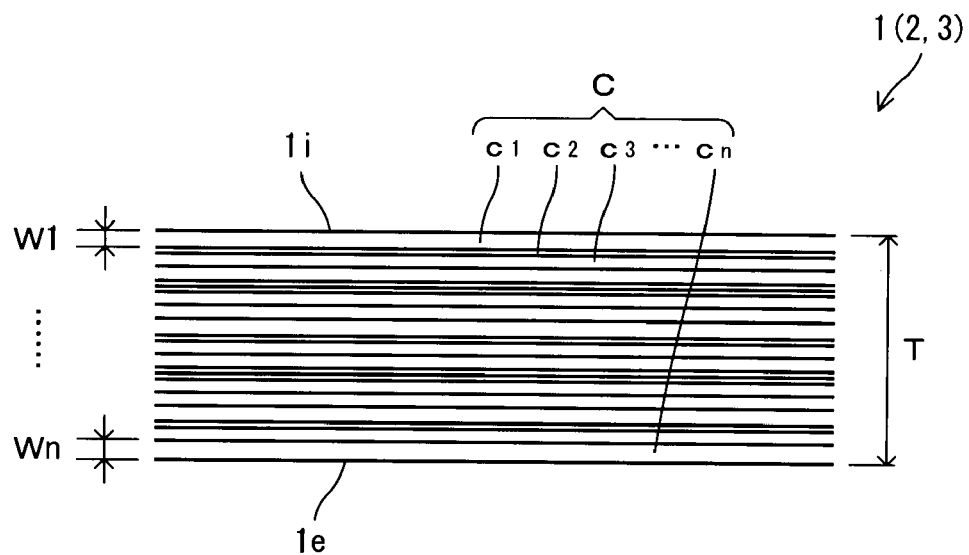
FIG. 3 is an enlarged cross-sectional view showing part of the electrode for cold cathode tube according to the embodiment.

In each of the electrodes 1 for cold cathode tube shown in FIG. 1 and FIG. 2, at least one portion selected from the sidewall portion 2 and the bottom portion 3 is made of a tungsten material. As the tungsten material, element tungsten or tungsten containing potassium or an electron emissive material is used. The portion made of the tungsten material has the fibrous crystalline structure extending substantially perpendicularly to the direction of its thickness T. FIG. 3 is an enlarged cross-sectional view showing the portion made of the tungsten material. In FIG. 3, an upper surface is an inner surface $1i$ of the sidewall portion 2 or the bottom portion 3, and a lower surface is an outer surface $1e$ of the sidewall portion 2 or the bottom portion 3. A distance between the inner surface $1i$ and the outer surface $1e$ is the thickness T, and the direction of the thickness T is the direction of the thickness defined in the present invention.

The portion made of the tungsten material has the fibrous crystalline structure C. The fibrous crystalline structure C is composed of an aggregate of a large number of fibrous crystal grains $C_1, C_2, C_3, \ldots C_n$. The fibrous crystalline structure C extends in the direction substantially perpendicular to the direction of the thickness T. The substantially perpendicular means a state where fiber directions of the fibrous grains of 90% or more in the crystalline structures are $90°\pm5°$ to the direction of the thickness T.

In the electrode 1 for cold cathode tube, at least one portion selected from the sidewall portion 2 and the bottom portion 3 needs to have the tungsten fibrous crystalline structure C. When the sidewall portion 2 and the bottom 3 are separately formed portions as shown in FIG. 1, it is preferable that at least the sidewall portion 2 has the tungsten fibrous crystalline structure C. When the sidewall portion 2 and the bottom portion 3 are originally integrated (excluding the lead-in wire 5) as shown in FIG. 2, it is preferable that the whole of the sidewall portion 2 and the bottom portion 3 has the tungsten fibrous crystalline structure C.

The fibrous crystalline structure C of tungsten needs to extend in the direction perpendicular to the direction of the thickness T. In the sidewall portion 2, they may extend along the axis J, or may extend along a circumferential direction of the sidewall portion 2 which is a direction orthogonal to the axis J.

The fibrous crystalline structure C of tungsten satisfies the condition of $0.003 \leq W/T \leq 0.07$, where T is the thickness of this portion and W is an average width of the fibrous crystalline structures C in the thickness direction. Here, units of T and W are both [mm]. As shown in FIG. 3, in a longitudinal cross section of the fibrous crystalline structure C, the average width W is expressed as $W=(w_1+w_2+w_3+\ldots+w_n)/n$, where $w_1, w_2, w_3, \ldots, w_n$ are the widths of the fibrous crystal grains $c_1, c_2, c_3, \ldots, c_n$ respectively in the direction of the thickness T.

To calculate the average width W, it is preferable to measure the widths $w_1, w_2, w_3, \ldots, w_n$ of all the fibrous crystal grains $c_1, c_2, c_3, \ldots, c_n$ contained between the inner surface $1i$ and the outer surface $1e$. Generally, the widths of the fibrous crystal grains in an arbitrary range (about 50 μm) in the direction of the thickness T are measured, and an average value thereof can be regarded as the average width W. Even in a case where the average value calculated by measuring and averaging the widths in the thickness range of about 50 μm is regarded as the average width W, the thickness T is the distance between the inner surface $1i$ and the outer surface $1e$.

The electrode 1 for cold cathode tube of this embodiment is structured such that at least one portion selected from the sidewall portion 2 and the bottom portion 3 includes the tungsten fibrous crystalline structure C, and the thickness T of this portion and the average width W of the fibrous crystalline structures C satisfy the predetermined relation. This achieves a reduction in the sputtering phenomenon-derived consumption of the electrode 1 and so on, which realizes a longer life, and further achieves enhancement in manufacturability of the electrode 1, which can make the electrode 1 low-priced.

Specifically, the electrode 1 for cold cathode tube is installed for use in a cold cathode tube. When charged particles such as Ar$^+$ ions generated based on ionization of Ne—Ar gas sealed in the cold cathode tube collide with the electrode, the electrode is sputtered and consumed. Since the consumption of the electrode by the sputtering takes place near boundaries of the crystal grains, the more boundaries of crystal grains a material of the electrode has, the more the electrode is consumed.

An electrode whose crystalline structure is isometric is greatly consumed by the sputtering since it has a larger number of boundaries of crystal grains. In the electrode 1 for cold cathode tube of this embodiment, the crystalline structure is the fibrous crystalline structure C and thus there are a relatively smaller number of boundaries of the crystal grains therein than in the isometric structure. Therefore, the consumption by the sputtering is reduced. Further, since the electrode 1 for cold cathode tube includes the fibrous crystalline structure C, it can have stronger mechanical strength in a specific direction than the isometric structure. This can reduce the occurrence of a crack caused by plastic working such as bending and drawing at the time of the manufacture of the electrode 1 for cold cathode tube.

Even in the electrode 1 for cold cathode tube including the fibrous crystalline structure C, if W/T is less than 0.003, the average width W of the fibrous crystalline structure C relative to the thickness T is too small. In this case, the number of the boundaries of the crystal grains increases, resulting in much consumption by the sputtering. In this embodiment, the average width W of the fibrous crystalline structures C is increased so that W/T becomes 0.003 or more. In this manner, the number of the boundaries of the crystal grains is decreased to reduce the consumption by the sputtering. The electrode 1 for cold cathode tube is capable of having a longer life.

Decreasing the number of the boundaries of the crystal grains by increasing the average width W of the fibrous crystalline structure C makes it possible to reduce the consumption by the sputtering. However, if W/T is over 0.07, the average width W of the fibrous crystalline structure C is too large and thus workability is lowered, which is likely to cause a crack during the manufacture. Therefore, the average width W of the fibrous crystalline structure C is controlled to 0.07 or less. This makes it possible to improve workability at the time of the manufacture of the electrode 1 for cold cathode tube.

The thickness T of the electrode 1 for cold cathode tube is preferably not less than 0.05 mm nor more than 0.40 mm. The thickness T less than 0.05 mm results in insufficient strength, which is likely to cause a crack during the manufacture. Further, when the electrode 1 for cold cathode tube is mounted for use in the cold cathode tube, a hole or the like is easily formed due to the consumption by the sputtering. When the thickness T is over 0.40 mm, a surface area of the inside of the electrode 1 for cold cathode tube decreases, leading to a failure in achieving a sufficient effect of lowering an operating voltage.

Figure 4:
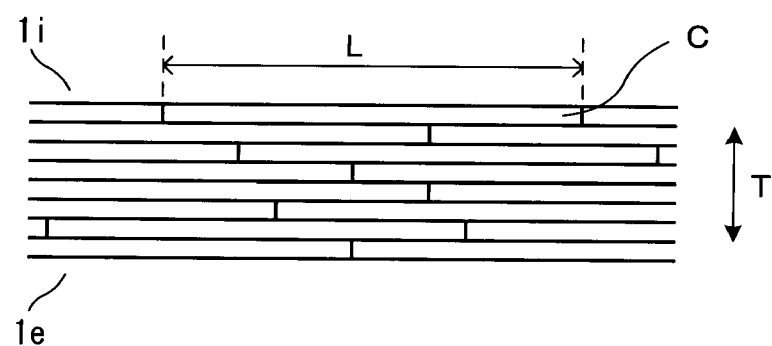
FIG. 4 is a cross-sectional view to illustrate a fiber length of a fibrous crystalline structure.

FIG. 4 shows part of FIG. 3 in an enlarged manner. As shown in FIG. 4, with a longitudinal length (fiber length) of the fibrous crystalline structure C defined as L, an average value of the fiber length L is preferably 100 μm or more. When the average value of the fiber length L is 100 μm or more, the number of the boundaries of the crystal grains is small and the consumption by the sputtering is also reduced. An upper limit of the average value of the fiber length L is not specifically limited, and the larger the average value is, the smaller the number of the boundaries of the crystal grains is, which is preferable since the consumption of the sputtering is reduced.

The portion having the tungsten fibrous crystalline structure C preferably contains at least one kind selected from potassium and an electron emissive material. As the electron emissive material, at least one kind selected from yttrium oxide, thorium oxide, lanthanum oxide, cerium oxide, zirconium oxide, and hafnium oxide is used. A single material among them may be used, or two kinds or more of them may be used in combination. Potassium and the electron emissive material lower a work function to facilitate electron emission, and further, those present in the boundaries of the crystal grains suppress the growth of the crystal grains.

When potassium or the electron emissive material is contained, the content thereof in tungsten is preferably 25 ppm (mass ratio) or more. It is not essential that both of potassium and the electron emissive material are contained in 25 ppm or more, and it is only necessary that at least one of potassium and the electron emissive material is contained in 25 ppm or more.

Potassium or the electron emissive material whose content is less than 25 ppm is not capable of sufficiently lowering the work function, resulting in a failure in sufficient enhancement in the electron emission characteristic. In order for W/T to fall within the predetermined range, the fiber length L of the fibrous crystalline structure C needs to be long to some extent, but if the content of potassium or the electron emissive material is small, it is difficult for the fiber length L of the fibrous crystalline structure C to be long enough. Whichever of potassium and the electron emissive material is contained, setting its content to 25 ppm or more facilitates the electron emission and makes it possible to set W/T within the predetermined range.

Too large a content of potassium or the electron emissive material is likely to constitute a starting point of a microscopic crack during the plastic working at the manufacture of the electrode 1 for cold cathode tube. Therefore, the content of potassium is preferably 200 ppm or less. The content of the electron emissive material is preferably 100000 ppm (10 mass %) or less.

The length of the electrode 1 for cold cathode tube, that is, the length from the outer surface of the bottom portion 3 to the opening portion 4 is generally not less than 3 mm nor more than 8 mm, preferably, not less than 4 mm nor more than 7 mm, though slightly differing depending on the size and performance of the cold cathode tube in which the electrode 1 for cold cathode tube is assembled. When the bottom portion 3 has a projecting portion, the length from an end portion of the projecting portion to the opening portion 4 is the length of the electrode 1 for cold cathode tube.

The diameter of the electrode 1 for cold cathode tube is generally not less than 1.0 mm nor more than 3.0 mm, preferably, not less than 1.3 mm nor more than 2.7 mm, though slightly differing depending on the size and performance of the cold cathode tube in which it is assembled. A ratio of the length and the diameter (length/diameter) of the electrode 1 for cold cathode tube is generally not less than 2 nor more than 3, preferably not less than 2.2 nor more than 2.8.

Next, a method of manufacturing the electrode 1 for cold cathode tube of this embodiment will be described. The method of manufacturing the electrode 1 for cold cathode tube having the shape shown in FIG. 2 will be mainly described below. First, tungsten powder or tungsten powder with potassium and/or the electron emissive material added, which is used for manufacturing the electrode 1 for cold cathode tube, is prepared.

An example of a method of preparing the tungsten powder is a method in which, by the application of a hydrogen reduction method, ammonium powder tungstate powder (APT) is turned into tungsten oxide, to which an aqueous solution of potassium or the electron emissive material (yttrium oxide or the like) is then mixed, and thereafter, the mixture is reduced. Another example of the preparation method is a method in which tungsten powder and powder of potassium or the electron emissive material are put in the same pot and are mixed by stirring. The method of preparing the tungsten powder is not limited, and any method appropriately selected from preparation methods of a wet type or a dry type is used.

Next, the tungsten powder is press-molded and is sintered, for example, in a hydrogen atmosphere under the condition of 200° C.×one hour. The resultant tungsten sintered compact is worked into a plate shape as a tungsten ribbon. For the working into the plate shape, for example, plastic working such as swaging, wire drawing, or rolling and annealing aiming at crystal control and stress relieving are combined to be alternately performed. The elastic working and the annealing are appropriately combined so that a sectional area of the tungsten sintered compact becomes 1.0% or less (reduction of area 99.0% or more), more preferably 0.4% (reduction of area 99.6% or more) relative to 100% which is the original sectional area of the tungsten sintered compact.

A temperature condition of the plastic working is preferably not lower than 700° C. nor higher than 1500° C. A temperature range of the annealing is preferably not lower than 1400° C. nor higher than 2400° C. Each of the plastic working and the annealing is preferably repeated twice or more. In such working processes, the operation of the plastic working followed by the annealing is preferably repeated. By repeating the plastic working and the annealing, it is possible to turn crystalline structure of the tungsten ribbon into fibrous crystalline structure extending substantially perpendicularly to its thickness direction and further to make the fibrous crystalline structure satisfies the condition of $0.003 \leq W/T \leq 0.07$.

Here, T is a thickness of the tungsten ribbon and W is an average width in the thickness direction of the fibrous crystalline structure in the tungsten ribbon. As will be described later, when the sidewall portion 2 of the electrode 1 for cold cathode tube is made of the tungsten ribbon, the thickness T of the tungsten ribbon corresponds to the thickness T of the sidewall portion 2 of the electrode 1 for cold cathode tube, and the average width W of the fibrous crystalline structure in the tungsten ribbon corresponds to the average width W of the fibrous crystalline structure C in the sidewall portion 2.

Such a tungsten ribbon is cut to a predetermined length and, for example, end portions thereof are put on each other, whereby a cylindrical portion which is to be the sidewall portion 2 is fabricated. Further, a dumet rod which is to be the lead-in wire 5 is inserted in one end portion of the cylindrical portion and is joined by caulking the end portion, whereby the electrode 1 for cold cathode tube is fabricated. When the tungsten ribbon is used to form the cylindrical sidewall portion 2, out of two sets of opposite sides of the tungsten ribbon, sides at both end portions in terms of a direction perpendicular to the longitudinal direction of the fibrous crystalline structure may be put on each other, or conversely, sides at both end portions in terms of the longitudinal direction of the tungsten ribbon may be put on each other.

In the above, to describe the method of manufacturing the electrode 1 for cold cathode tube of the present invention, the method of manufacturing the electrode 1 for cold cathode tube 1 shown in FIG. 2 is taken as an example. In order to manufacture the electrode 1 for cold cathode tube shown in FIG. 1, after the tungsten ribbon is worked into the cylindrical shape, a metal plate which is to be the bottom portion 3 is joined to one end portion of the cylindrical portion, and the dumet rod which is to be the lead-in wire 5 is joined to the metal plate.

Next, the effect when W/T is set to fall within the predetermined range and the effect when potassium and/or an electron emissive material is added to tungsten will be described based on the results of experiments. The following experiments were conducted on tungsten ribbons used for manufacturing the electrode 1 for cold cathode tube, and T is a thickness of each of the tungsten ribbons and W is an average width in the thickness direction of fibrous crystalline structure in each of the tungsten ribbons.

The thickness T of the tungsten ribbon corresponds to the thickness T of the portion having the fibrous crystalline structure C of the electrode 1 for cold cathode tube, and the average width W of the fibrous crystalline structure in the tungsten ribbon corresponds to the average width W of the fibrous crystalline structure C of the electrode 1 for cold cathode tube. The results of the experiments on the tungsten ribbons can be regarded as the results of experiments on the electrode 1 for cold cathode tube.

(Measurement of Sputtering Yield)

Tungsten ribbons different in W/T were fabricated and were subjected to the measurement of sputtering yield. Tungsten powder used for fabricating the tungsten ribbons was prepared in the following manner. By the application of the hydrogen reduction method, ammonium powder tungstate powder (APT) was turned into tungsten oxide, which was then mixed with an aqueous solution of potassium, and thereafter, the mixture was reduced. An amount of potassium added was adjusted so that its content (mass ratio) in the finally fabricated tungsten ribbons became 50 ppm.

After the tungsten powder was press-molded, it was sintered in the hydrogen atmosphere under the condition of 2000° C.×one hour. The resultant tungsten sintered compact was repeatedly subjected to alternate rolling and annealing. In this manner, the plural tungsten ribbons each having fibrous crystalline structure extending in the direction substantially perpendicular to the thickness direction, with the same thickness T of 0.15 mm and with different W/T, were fabricated. W/T was adjusted by a working ratio of the rolling and the condition (temperature and time) of the annealing.

The sputtering yield was measured based on a thickness of each film formed on a Si substrate. Specifically, a sputtering apparatus was used, and the thickness of each deposit film was measured under the following setting: distance between the substrate-target (tungsten ribbon) 100 mm; back pressure $1 \times 10^{-4}$ Pa; output power 200 W; Ar flow rate 20 sccm, and sputtering time 5 min. The result of the measurement is shown in Table 1 and FIG. 5.

TABLE 1

| W/T | sputtering yield (atoms/ion) |
|---|---|
| 0.001 | 0.68 |
| 0.002 | 0.63 |
| 0.003 | 0.58 |
| 0.004 | 0.59 |
| 0.005 | 0.58 |
| 0.01 | 0.57 |
| 0.03 | 0.58 |
| 0.05 | 0.57 |
| 0.07 | 0.57 |
| 0.10 | 0.57 |

Figure 5:
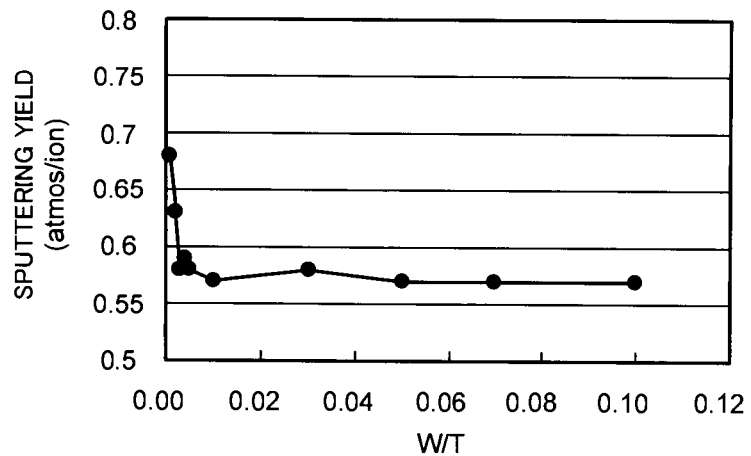
FIG. 5 is a chart showing the result of measurement of sputtering yield.

As is apparent from Table 1 and FIG. 5, the tungsten ribbons with W/T being 0.003 or more are low in sputtering yield. From this, it has been confirmed that the use of a tungsten material with W/T being 0.003 or more to form the electrode 1 for cold cathode tube makes it possible to reduce the consumption by the sputtering to realize a longer life.

(Measurement of Bending Times)

Tungsten ribbons similar to those used for the measurement of the sputtering yield were subjected to repeated bending with a 90° bending angle by using a jig in which a curvature R of a bending contact portion was 2 mm. The number of times each of the tungsten ribbons was bent until a crack occurred therein was measured. The result of the measurement is shown in Table 2 and FIG. 6.

TABLE 2

| W/T | number of bending times (times) |
|---|---|
| 0.001 | 16 |
| 0.005 | 14 |
| 0.01 | 13 |
| 0.03 | 11 |
| 0.05 | 10 |
| 0.06 | 9 |
| 0.07 | 8 |
| 0.08 | 1 |
| 0.09 | 0 |
| 0.10 | 0 |

Figure 6:
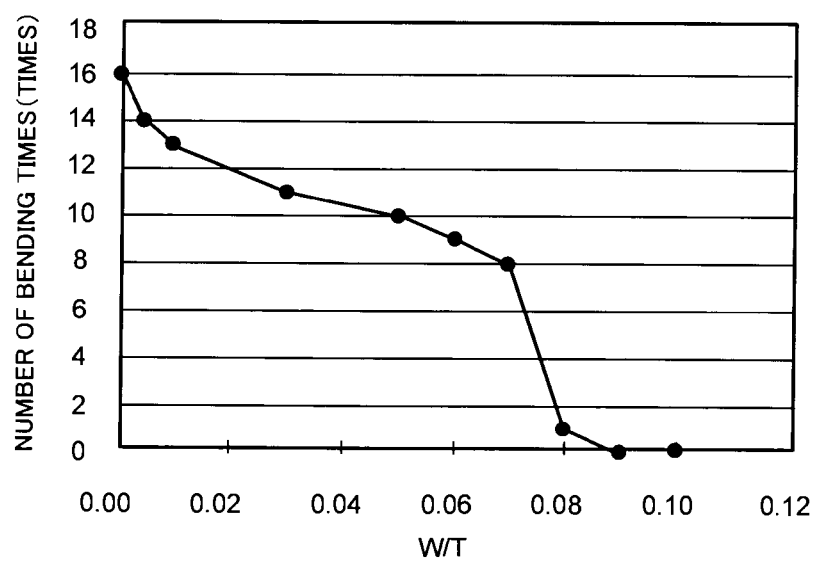
FIG. 6 is a chart showing the result of measurement of the number of bending times.

As is apparent from Table 2 and FIG. 6, when W/T is over 0.07, a crack occurs even when the number of bending times is small. From this, it has been confirmed that the use of a tungsten material with W/T being 0.07 or less to form the electrode 1 for cold cathode tube makes it possible to improve manufacturability of the electrode 1 for cold cathode tube. The improved manufacturability of the electrode 1 for cold cathode tube contributes to a reduction in manufacturing cost.

(Measurement of Work Function)

In order to examine the effect that potassium and electron emissive materials contribute to the improvement in electron emission efficiency, the measurement of work functions were conducted on tungsten ribbons containing potassium and/or an electron emissive material. A reduction in work function enables enhanced electron emission efficiency.

The measurement of the work function was conducted on the following four kinds: (1) a tungsten ribbon containing only potassium; (2) a tungsten ribbon containing only an electron emissive material (thorium oxide); (3) a tungsten ribbon containing potassium and an electron emissive material (thorium oxide); (4) a tungsten ribbon containing potassium and two kinds of electron emissive materials (lanthanum oxide and cerium oxide). As the tungsten ribbons used for the measurement of the work functions, used were those which were manufactured in the same manner as those used for the measurement of the sputtering yield except in that the contained materials were different and in which W/T was 0.05.

Figure 7:
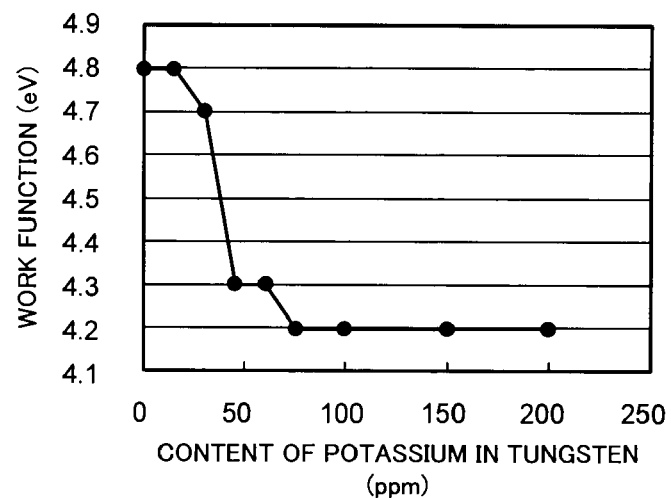
FIG. 7 is a chart showing a correlation between the content of potassium and work function.

(1) The result of the measurement when only potassium was contained is shown in Table 3 and FIG. 7. (2) The result of the measurement when only the electron emissive material (thorium oxide) was contained is shown in Table 4 and FIG. 8. (3) The result of the measurement when potassium and the electron emissive material (thorium oxide) were contained is shown in Table 5. (4) The result of the measurement when potassium and two kinds of the electron emissive materials (lanthanum oxide and cerium oxide) were contained is shown in Table 6.

TABLE 3

| content of potassium (ppm) | work function (eV) |
|---|---|
| 0 | 4.8 |
| 15 | 4.8 |
| 30 | 4.7 |
| 45 | 4.3 |
| 60 | 4.3 |
| 75 | 4.2 |
| 100 | 4.2 |
| 150 | 4.2 |
| 200 | 4.2 |

TABLE 4

| content of thorium oxide (ppm) | work function (eV) |
|---|---|
| 0 | 4.8 |
| 15 | 4.7 |
| 30 | 4.7 |
| 45 | 4.0 |
| 60 | 4.1 |
| 75 | 4.0 |
| 100 | 4.0 |
| 1000 | 4.0 |
| 1700 | 3.8 |

TABLE 5

| content of potassium (ppm) | content of thorium oxide (ppm) | work function (eV) |
|---|---|---|
| 0 | 0 | 4.8 |
| 0 | 1000 | 4.0 |
| 0 | 1700 | 3.8 |
| 50 | 0 | 4.3 |
| 50 | 1000 | 3.9 |
| 50 | 1700 | 3.8 |

TABLE 6

| content of potassium (ppm) | content of thorium oxide (ppm) | content of cerium oxide (ppm) | work function (eV) |
|---|---|---|---|
| 0 | 0 | 0 | 4.8 |
| 0 | 50 | 0 | 4.3 |
| 50 | 50 | 0 | 4.2 |
| 0 | 50 | 50 | 4.0 |
| 50 | 50 | 50 | 4.0 |

As is apparent from Table 3 and FIG. 7, when the content of potassium is 25 ppm or more, it is possible to reduce the work function. The use of such a material makes it possible to provide the electrode 1 for cold cathode tube which easily emits electrons and is excellent in discharge start characteristic. Especially, setting the content of potassium to 40 ppm or more enables an effective reduction in work function. This is suitable as a material forming the electrode 1 for cold cathode tube.

Figure 8:
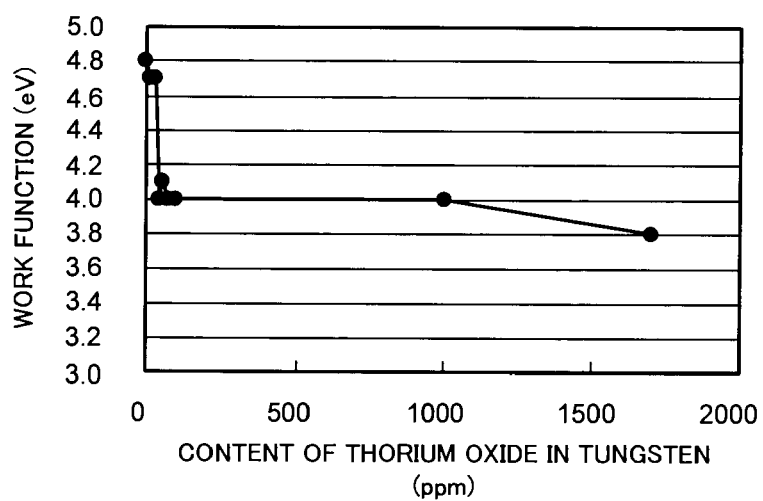
FIG. 8 is a chart showing a correlation between the content of an electron emissive material and work function.

As is apparent from Table 4 and FIG. 8, when the electron emissive material (thorium oxide) is contained instead of potassium, it is possible to reduce the work function. It is seen that its content is preferably 25 ppm, more preferably, 40 ppm or more. Further, as is apparent from Table 5, potassium and the electron emissive material may be used in combination. As is apparent from Table 6, two kinds of the electron emissive materials (lanthanum oxide and ceriumoxide) may be used in combination, and two kinds of the electron emissive materials and potassium may be used in combination.

Figure 9:
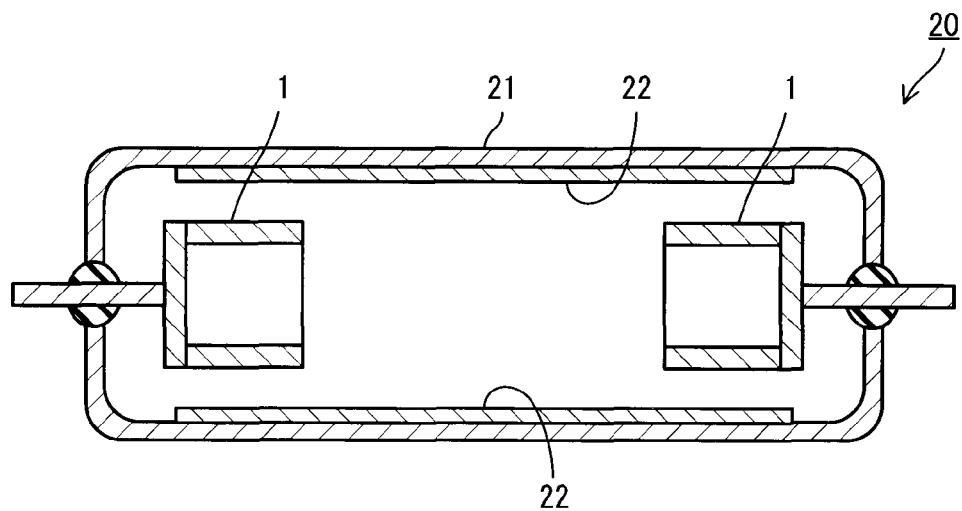
FIG. 9 is a cross-sectional view showing a cold cathode tube according to an embodiment of the present invention.

Next, a cold cathode tube according to an embodiment of the present invention will be described. FIG. 9 is a cross-sectional view showing the structure of the cold cathode tube according to the embodiment of the present invention. The cold cathode tube 20 shown in FIG. 9 includes a tubular translucent bulb 21 on whose inner wall surface phosphor layers 22 are provided. The electrodes 1 shown in FIG. 1 are provided to face each other in both end portions of the tubular translucent bulb 21. A not-shown discharge medium is sealed inside the tubular translucent bulb 21. Using the electrode 1 for cold cathode tube of the above-described embodiment, the cold cathode tube 20 can be manufactured at low cost, easily starts discharging, and can have a longer life.

As the constituent elements of the cold cathode tube 20 except the electrodes 1, that is, as the tubular translucent bulb 21, the phosphor layers 22, and the discharge medium, those conventionally applied to a cold cathode tube of this type, in particular, a cold cathode tube for backlight are usable as they are or are usable with appropriate modification. An example of the discharge medium is rare gas-mercury based gas (the rare gas is argon, neon, xenon, krypton, or a mixture of these). An example of a phosphor forming the phosphor layers 22 is one emitting light when stimulated by ultraviolet light, preferably, a calcium halophosphate phosphor. An example of a tubular translucent bulb 21 is a glass tube with a length of not less than 60 mm nor more than 700 mm and a diameter of not less than 1.6 mm nor more than 4.8 mm.

Figure 10:
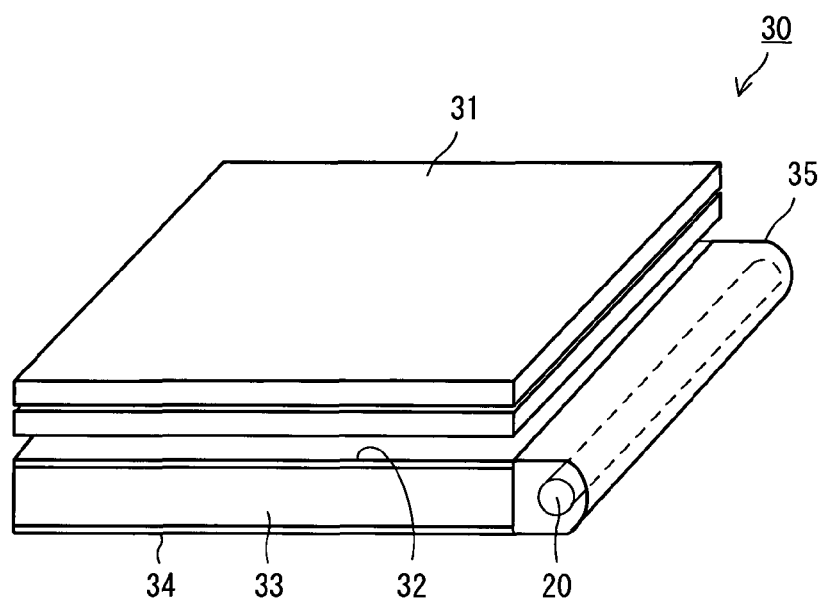
FIG. 10 is across-sectional view showing a liquid crystal display device according to an embodiment of the present invention.

Next, a liquid crystal display device according to an embodiment of the present invention will be described. FIG. 10 is a perspective view showing the structure of the liquid crystal display device according to the embodiment of the present invention. The liquid crystal display device 30 shown in FIG. 10 includes a liquid crystal display panel 3. For example, the liquid crystal display panel 31 has a liquid crystal layer sealed between two glass substrates on whose inner surfaces liquid crystal driving electrodes are formed, and has not-shown polarization plates bonded on its front surface and rear surface.

A light guide 33 made of, for example, an acrylic flat plate is set on the rear surface side of the liquid crystal display panel 31 via a diffusion plate 32. The light guide 33 is disposed with its front surface being parallel to the liquid crystal display panel 31. On a rear surface of the light guide 33 opposite its front surface, a reflector 34 is disposed. The cold cathode tube 20 of the above-described embodiment is disposed in proximity to one side surface (plane of incidence) of the light guide 33. The cold cathode tube 20 is covered by a reflector 35.

In the liquid crystal display device 30, outgoing light from the cold cathode tube 20 enters the inside of the light guide 33 from the plane of incidence of the light guide 33 and propagates in a planar form while repeatedly reflected. The outgoing light from the light guide 33 is diffused by the diffusion plate 32 to be radiated to the liquid crystal display panel 31. Between the light guide 33 and the diffusion plate 32, a prism sheet or the like as a light condenser may be disposed in order to improve brightness of the liquid crystal display device 30.

Incidentally, the number of the cold cathode tubes 20 provided in the liquid crystal display device 30 may be two or more. A light diffuser, a surface protector, an antireflector preventing or reducing the reflection of external light, an antistatic member, and so on may be provided on an observation surface side of the liquid crystal display device 30 when necessary. Further, a supporting substrate holding each constituent member at a predetermined position, a frame, a spacer, and a case housing these constituent members may be provided. As the constituent members of the liquid crystal display device 30 except the cold cathode tube 20, conventionally used ones are usable.

INDUSTRIAL APPLICABILITY

In the electrode for cold cathode tube according to an aspect of the present invention, the fibrous crystalline structures of the tungsten material forming at least part thereof can contribute to a reduction in the consumption by the sputtering phenomenon and so on and to the improvement in manufacturability. This makes it possible to provide a low-priced electrode for cold cathode tube excellent in life characteristic. The cold cathode tube using such an electrode is suitably used in various kinds of devices, typically, a liquid crystal display device because of its excellent discharge characteristic, reliability, manufacturing cost, and so on.

What is claimed is:

1. An electrode for cold cathode tube, comprising:
   a cylindrical sidewall portion formed by working a tungsten plate into a cylindrical shape, wherein the tungsten plate is made of only tungsten or tungsten containing at least one selected from: potassium in a range from 25 to 200 ppm and an electron emissive material in a range from 25 to 100,000 ppm;
   a bottom portion provided at one end of the sidewall portion formed by swaging the end of the cylindrical sidewall portion, or by bonding the tungsten plate to the end of the cylindrical sidewall portion; and
   an opening portion provided at the other end of the sidewall portion,
   wherein the cylindrical sidewall portion has a fibrous crystalline structure extending substantially perpendicularly to a direction of thickness of the cylindrical sidewall portion, and the fibrous crystalline structure satisfies $0.003 \leq W/TA \leq 0.07$, where TA is the thickness of the cylindrical sidewall portion and W is an average width of the fibrous crystalline structures in the direction of the thickness.

2. The electrode according to claim 1, wherein the electron emissive material is at least one selected from yttrium oxide, thorium oxide, lanthanum oxide, cerium oxide, zirconium oxide, and hafnium oxide.

3. The electrode according to claim 1, wherein a longitudinal length of the fibrous crystalline structure is 100 μm or more.

4. The electrode according to claim 1, wherein the thickness TA of the cylindrical sidewall portion is in a range of 0.05 mm or more and 0.4 mm or less.

5. A cold cathode tube, comprising:
   a tubular translucent bulb in which a discharge medium is sealed;
   a phosphor layer provided on an inner wall surface of the tubular translucent bulb; and
   a pair of electrodes disposed in both end portions of the tubular translucent bulb, each of the electrodes comprising the electrode for cold cathode tube according to claim 1.

6. A liquid crystal display device, comprising:
   the cold cathode tube according to claim 5;
   a light guide disposed in proximity to the cold cathode tube;
   a reflector disposed on one surface side of the light guide; and a liquid crystal display panel disposed on the other surface side of the light guide.

7. The electrode according to claim 1, wherein the bottom portion has the fibrous crystalline structure extending substantially perpendicularly to a direction of thickness of the bottom portion, and the fibrous crystalline structure satisfies $0.003 \leq W/TB \leq 0.07$, where TB is a thickness of the bottom portion.

8. The electrode according to claim 7, wherein the thickness TB of the bottom portion is in a range of 0.05 mm or more and 0.4 mm or less.

9. The electrode according to claim 1, wherein a length of the electrode is in a range of 3 mm or more and 8 mm or less.

10. The electrode according to claim 9, wherein a diameter of the electrode is in a range of 1 mm or more and 3 mm or less.

11. The electrode according to claim 10, wherein a ratio of the length of the electrode to the diameter of the electrode is in a range of 2 or more and 3 or less.

12. An electrode for cold cathode tube, comprising:
a cylindrical sidewall portion comprising a tungsten plate, wherein the tungsten plate is made of only tungsten or tungsten containing at least one selected from: potassium in a range from 25 to 200 ppm and an electron emissive material in a range from 25 to 100,000 ppm;
a bottom portion provided at one end of the sidewall portion; and
an opening portion provided at the other end of the sidewall portion,
wherein the cylindrical sidewall portion has a fibrous crystalline structure extending substantially perpendicularly to a direction of thickness of the cylindrical sidewall portion, and the fibrous crystalline structure satisfies $0.003 \leq W/TA \leq 0.07$, where TA is the thickness of the cylindrical sidewall portion and W is an average width of the fibrous crystalline structures in the direction of the thickness.

* * * * *